United States Patent [19]

Bardy

[11] Patent Number: 5,641,132
[45] Date of Patent: Jun. 24, 1997

[54] DEVICE FOR STORAGE OF NON-VULCANIZED RUBBER PRODUCTS ON BOBBINS

[75] Inventor: Daniel Bardy, Clermont-Ferrand, France

[73] Assignee: Compagnie Generale des Etablissements Michelin-Michelin et Cie, Clermont-Ferrand, France

[21] Appl. No.: 510,927

[22] Filed: Aug. 3, 1995

[30] Foreign Application Priority Data

Aug. 5, 1994 [FR] France .................. 94 09837

[51] Int. Cl.⁶ .............. B65H 18/08; B65H 75/14
[52] U.S. Cl. .................... 242/536; 242/602.3
[58] Field of Search .................. 242/602.3, 536, 242/160.1, 160.3, 160.4; 206/389, 390, 412, 417

[56] References Cited

U.S. PATENT DOCUMENTS

| 1,181,937 | 5/1916 | Stevens | 206/389 |
| 3,102,700 | 9/1963 | Lemieux | 242/602.3 |
| 3,732,974 | 5/1973 | Ram et al. | 206/389 |

FOREIGN PATENT DOCUMENTS

| 0567147 | 10/1993 | European Pat. Off. . |
| 0621124 | 10/1994 | European Pat. Off. . |
| 822771 | 11/1951 | Germany . |
| 1260767 | 2/1968 | Germany . |
| 1262584 | 3/1968 | Germany . |
| 2315971 | 10/1974 | Germany ............ 242/536 |
| 61-111261 | 5/1986 | Japan . |

Primary Examiner—John M. Jillions
Attorney, Agent, or Firm—Robert R. Reed; Russell W. Warnock

[57] ABSTRACT

A device for storage of an uncured rubber product is provided. The device is comprised of:

a bobbin composed of two flanges, each equipped with a border support portion fitted on the axially interior side of said flange, the border support portion having the general appearance of a spiral forming several turns, said border support portion being shifted forward, on each turn, axially toward the outside;

an interleaf in the form of an elongated strip, resting on the said border support portions, the interleaf having a variable width, adapted to the axial distance between the said border support portions.

11 Claims, 2 Drawing Sheets

DEVICE FOR STORAGE OF NON-VULCANIZED RUBBER PRODUCTS ON BOBBINS

BACKGROUND OF THE INVENTION

The present invention concerns production of rubber products. More precisely, it relates to storage of uncured rubber products delivered from extrusion.

It is known that, in the non-vulcanized state, rubber presents a rather plastic state. It results that it is very difficult for this material to keep its geometric dimensions unchanged if it is stressed mechanically, for example by materials handling operations. It is thus that it is common usage to use interleaves on which the uncured rubber product to be manipulated is laid. The interleaf is constructed of a material presenting sufficient resistance to elongation. It can be rigid or flexible according to the expected utilization. In all cases, it plays the role of a holder for the uncured rubber material (whose state is plastic) and provides a grip permitting all desired manipulations.

As an illustration of the state of the art, patent application EP 0 567 147 can be cited, illustrating an interleaf used in the tire industry. The latter is shown in the form of an elongated strip, of dimensions which cannot be altered under the effect of stresses from utilization, presenting two border portions intended to protect the product stored between them on the strip. Unfortunately, when it is desired to store the product in bobbins, the proposed solution is somewhat maladapted because the border portions in question, even when cut at regular intervals, inevitably impede flexing of the said strip during winding.

SUMMARY OF THE INVENTION

The objective of the present invention is to propose an interleaf capable of very effectively holding the uncured rubber product to be stored, all while very easily allowing winding of the product and its interleaf.

Another objective of the present invention is to ensure perfect homogeneity of the stored products, as regards their geometry such as it results from a forming operation, for example calendaring or extrusion, and as regards their mechanical properties.

Another objective of the invention consists of facilitating good cooling of the stored products, that is to say uniform and rapid cooling.

The invention proposes a device for storing an uncured rubber product, comprised of:
   a bobbin composed of two flanges, each equipped with a border support portion fitted on the axially interior side of the said flange, the border support portion having the general appearance of a spiral forming more than one turn, said border support portion being shifted forward, on each turn, axially toward the outside;
   an interleaf for holding the said rubber product, said interleaf having the form of an elongated strip, resting on the said border support portions, having a variable width, adapted to the axial distance between the said border support portions.

BRIEF DESCRIPTION OF THE DRAWINGS

The invention will be perfectly understood through consultation of the following description, illustrating with the help of the attached figures.

DETAILED DESCRIPTION OF THE PREFERRED EMBODIMENT

Figure 1:
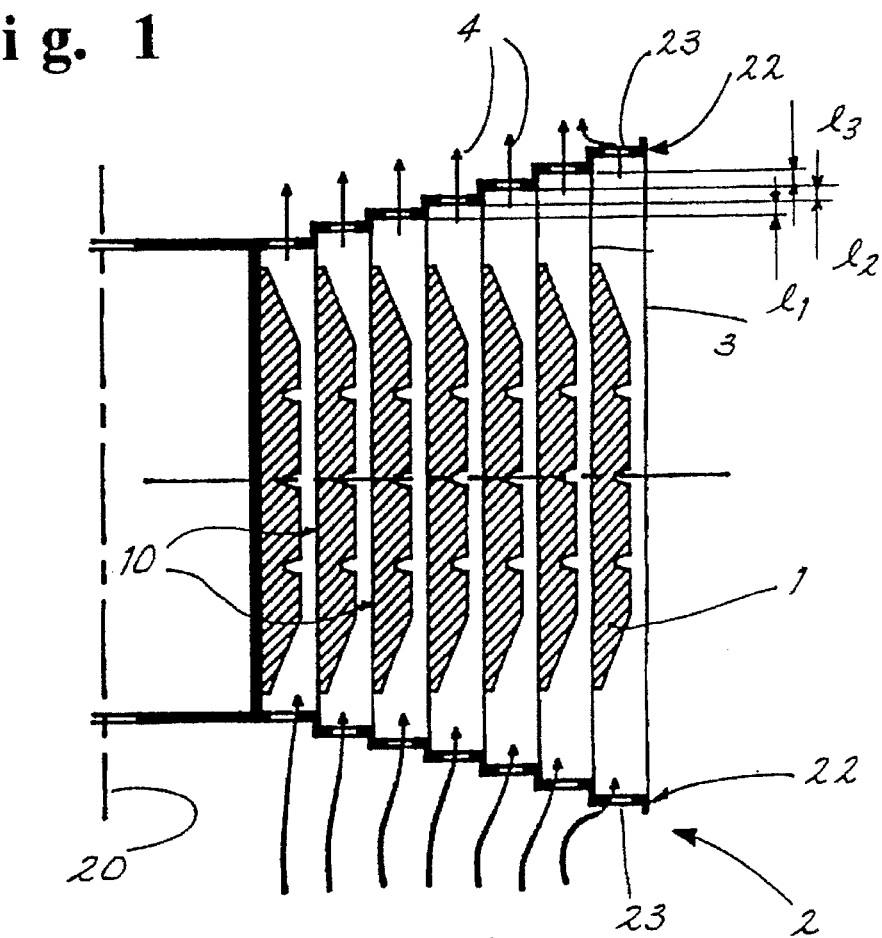
FIG. 1 is a vertical sectional view of the storage device according to the invention.

As an example of the utilization of the invention, the storage of a tread strip 1 is described, such as it is conformed by an extrusion operation. The extrusion operation is a continuous operation aimed at always producing the same profile over a long length. It is important that, not only the dimensions, the precise form of the extruded profile, remain strictly unchanged, but again, the mechanical properties of the extruded product must remain uniform along the entire length of the tread strip.

On the different figures is seen a bobbin 2 which includes an axis of rotation 20. The bobbin is composed of two flanges 21, each equipped with a border support portion 22, fitted on the axially interior side of said flange 21. The border support portion 22 has the general appearance of a spiral forming several turns. On each turn, the said border support portion 22 is shifted forward axially toward the outside as it appears very well on FIG. 1.

The spiral which the border support portion 22 forms is therefore not included in a plane. Seen from the radial section view, as in FIG. 1, the border support portion 22 forms a stairway, oriented such that the distance between border support portions 22 belonging to the various flanges 21, measured parallel to the axis of rotation 20 of the bobbin 2, increases progressively starting from the center of the bobbin 2 toward the exterior of the latter.

Still looking at the radial section view in FIG. 1, it is noticed that, preferably, on each of the two flanges 21, the steps which the border support portions 22 form are equidistant from the axis of rotation 20. Thus, by pushing against the border support portions 22, an interleaf 3 can be wound such that it remains continuously parallel to the axis of rotation of the bobbin 2. Thus the same type of winding is reproduced as that which would be obtained by winding an interleaf in contiguous spirals as known in the state of the art. On each turn, the said border support portion 22 shifts forward radially by a sufficient height so that, considering the thickness of the product stored, there remains at least a slight gap between the product and the next spiral of the interleaf 3.

The interleaf 3 used here is presented in the form of an elongated strip, designed to rest on the border support portions 22. Its width is therefore variable: it is adapted to the axial distance between the said border support portions 22, itself variable according to the level considered in the radial direction.

Preferably, the axial distance between the border support portions 22 of each flange 21 increases progressively and regularly when moving along a border portion from the smallest radii toward the largest radii. It is thus very easy to wind an interleaf 3 whose width also increases regularly, in a corresponding way, while moving along its length.

Figure 4:
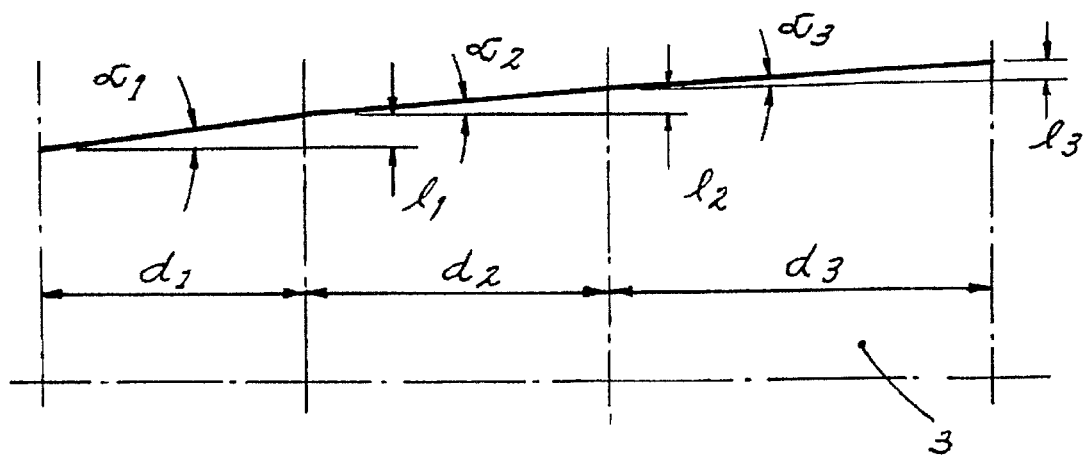
FIG. 4 is a view of an extent of one of the border support portions of the device according to the invention.

In FIG. 1 it is seen that the increase in width (see $l_1$, $l_2$, $l_3$) of the interleaf strip 3 is the same value at each turn. In FIG. 4, the said value $l_1+l_2+l_3$ has been written out, as well as the developed length $d_1+d_2+d_3$ of the interleaf strip 3 for three consecutive windings, that is to say for three arcs of 360°. Since the radius of winding increases constantly and regularly, the segments $d_1$, $d_2$, and $d_3$ increase in length: in FIG. 4, it is seen that $d_1 < d_2 < d_3$. It is noticed that, for an increasing quantity $1_1 = 1_2 = 1_3$ of the half-width of the constant strip at each winding turn, it is necessary to use a strip whose borders present segments forming an angle which progressively decreases as the width of the strip 3 increases. It is noted that $\alpha_1 > \alpha_2 > \alpha_3$. Inversely, it could be decided to use an interleaf with borders forming straight lines of constant angle relative to the median line, and in this case the value of width increase from one border support portion to the other on the bobbin increases with the radius of winding.

In an advantageous way, the device is symmetrical relative to the median plane perpendicular to the axis of said bobbin 2.

Figure 3:
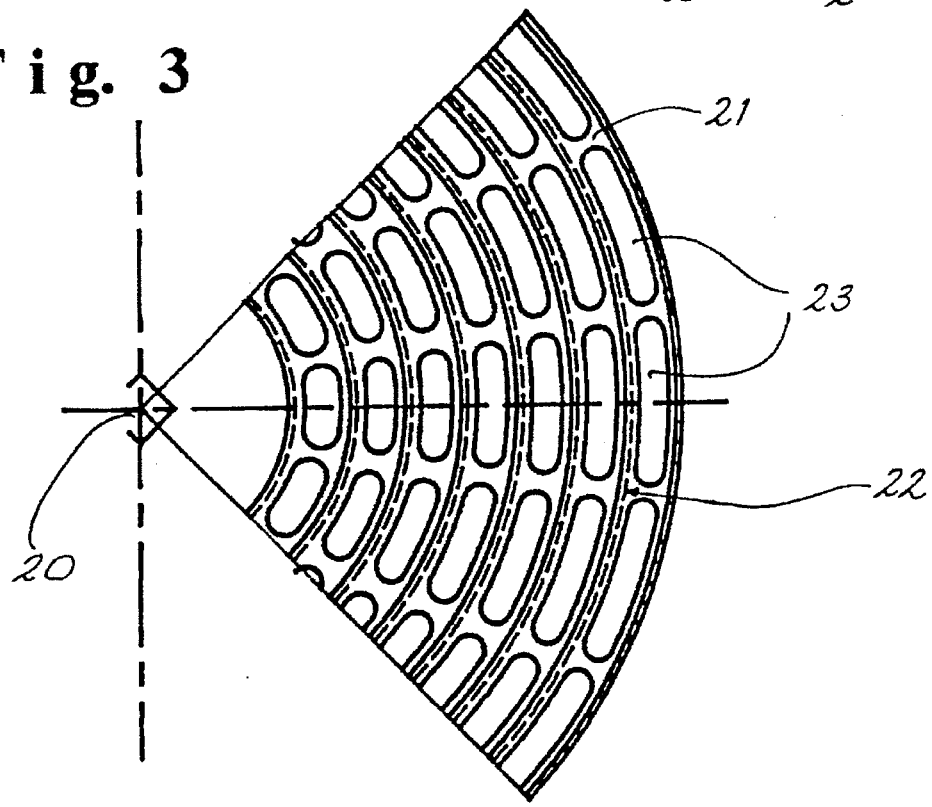
FIG. 3 is a side view of the device illustrated by FIG. 1.
Figure 2:
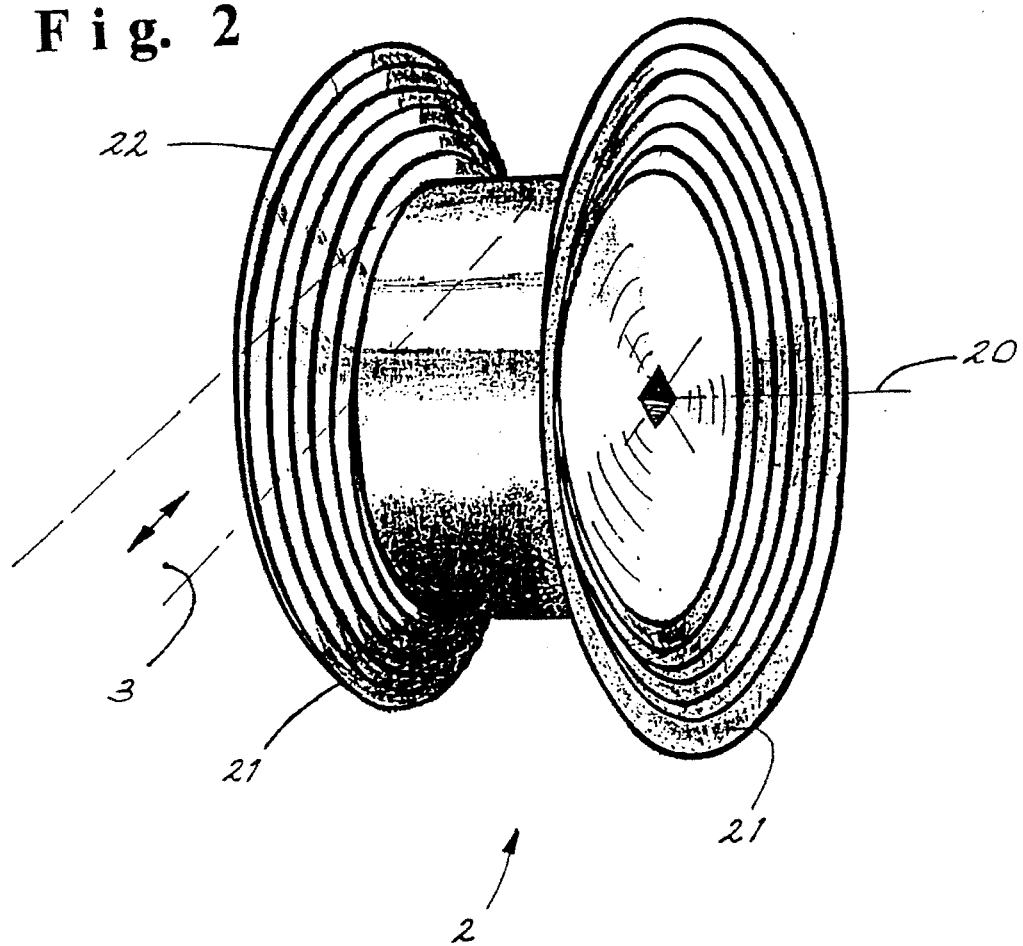
FIG. 2 is a perspective view of the storage device.

One of the problems still poorly resolved in the state of the art is to guarantee a thermic condition as homogeneous as possible for the extruded rubber product, regardless of the location considered. During storage, the uncured rubber product cools. With most of the storage systems used, it cools in a non-homogeneous way. This is especially critical when the product is stored in bobbins. In one of its variations, the invention proposes a device in which the flanges 21 of the bobbin 2 are perforated: in FIG. 3 in particular, it is very easy to see the openings 23 allowing the circulation of air on the interior of the bobbin 2, the circulation being symbolized by the arrows 4.

The invention also extends to a process of storage at delivery of an uncured rubber product from a forming operation, in which the said product is laid out hot, after the said forming, on an interleaf in the form of an elongated strip having a variable width, always increasing along the length of the said interleaf from one extremity to the other, said width having a minimum value greater than or equal to the width of the extruded product.

According to one aspect of the storage process according to the present invention, the said interleaf is then wound on a bobbin composed of two flanges, each equipped with a border support portion to hold the interleaf, fitted on the axially interior side of each flange, the border support portion having the general appearance of a spiral forming several turns, said border support portion shifting forward, on each turn, axially toward the exterior, winding of the said interleaf starting on the side of minimum width of the latter.

Observe that, at the time of winding on a storage bobbin 2 the interleaf 3 holding a product to be stored, said interleaf 3 is wound spirally by going from the part of the interleaf with the smallest width, immobilized on the bobbins 2 at the point closest to the axis of rotation of the latter, toward the part of the interleaf of largest width as one moves away from the said axis of rotation. To attach the interleaf at the beginning, the interleaf and the bobbin 2 can be supplied for example with strips such as a hook and loop type fastener commercially available under the registered trademark "Velcro" providing attachment through simple contact and allowing release through traction of sufficient force and properly oriented direction. Note that the part of this attachment by "Velcro" strip attached on the bobbin offers a very visible reference point for the operator to easily identify the starting point of winding on the bobbin 2. It is in fact important that the said starting point of winding respect a given azimuth so that the interleaf, of variable width, is correctly positioned on the border support portions 22.

To hold the interleaf at the end of winding, "Velcro" strips can again be used, placed on the one hand on the extension of the interleaf 3 beyond the surface supporting the tread strip 1, and on the other hand on the back of the said interleaf 1 and on the rear at a distance corresponding to one turn, so that the said "Velcro" strips overlap at the end of winding. In a very advantageous manner, it can also be planned for the interleaf 3 to have an excess length of one turn, so that the last turn of the winding protects the exposed surface of the tread strip.

At the time of removal of the product from storage, for example the tread strip 1, in order to facilitate later re-use of the interleaf 3, the interleaf is wound up as it is unwound from the said storage bobbin 2 to continuously remove the tread strip 1. The interleaf 3 is therefore found wound up by starting with the part of largest width and by finishing this winding, which will be called "pre-storage winding" with the part of smallest width. This is the reverse situation from the winding onto the bobbin 2 according to the invention. The winding is thus found immediately ready to be unwound simultaneously at extrusion and at the placement of a tread strip at the time of a new stage of extrusion. Since the pre-storage winding ended with the part of the interleaf with the smallest width, it is therefore indeed the latter which is presented first on the bobbin 2 at the beginning of the stage of extrusion and which is laid on the interleaf 3.

An interesting material for the interleaf is aluminum. It protects the sole 10 of the tread strip 1, which improves its capacity to stick, in the uncured state, to the other components of the tire when it is used at the time of assembly of a tire. In addition, because of its good thermic conductivity, aluminum contributes to maintaining the tread strip 1 at the same temperature at all locations on the bobbin 2. A material such as steel presents similar properties. Concerning the bobbin 2, it is preferably made from an injected plastic material.

In the special case where a bobbin 2 with perforated flanges 21 is used, then it is preferred that the bobbin on which the said product is wound is stored vertically. This greatly favors thermic exchanges by convection, as illustrated by the arrows 4 on FIG. 1. The exchange by convection can be reinforced further by setting up forced circulation of air.

Owing to the invention, the qualities of homogeneity of the extruded or formed uncured rubber product are not degraded by the storage. To illustrate the advantage of the invention, it can be cited that it has allowed improvement in the consistency of wear of the tire tread in certain penalizing utilizations, and this in a very significant manner.

Of course, application of the invention is not limited to either storage of tread strips or even to the tire industry. Each time that problems of deformation of products stored in long length in a very plastic state arise, it will be able to be used advantageously.

I claim:

1. Device for storage of an uncured rubber product, comprised of:

a bobbin consisting of two flanges, each supplied with a border support portion situated on the axially interior side of the said flange, the border support portion having the general appearance of a spiral forming more than one turn, said border support portion shifting forward, on each turn, axially toward the exterior;

an interleaf for holding the said rubber product, said interleaf having the form of an elongated strip, resting on the said border support portions, having a variable width, adapted to the axial distance between the said border support portions.

2. Device according to claim 1, in which the axial distance between the border portions of each flange increases progressively when moving along the length of a border portion from the smallest radii toward the larger radii, and in which the width of the said interleaf increases in a corresponding manner when moving along its length.

3. Device according to one of claims 1 to 2, wherein the bobbin is symmetrical relative to the median plane perpendicular to the axis of the said bobbin.

4. Device according to one of claims 1 to 3, in which the flanges of the bobbin are perforated.

5. Process of storage at delivery of an uncured rubber product from a forming operation, comprising laying out the said product hot, after said forming, on an interleaf in the form of an elongated strip having a variable width, and winding the interleaf on a bobbin consisting of two flanges, each supplied with a border support portion situated on the axially interior side of the said flange, the border support portion having the general appearance of a spiral forming more than one turn, said border support portion shifting forward, on each turn, axially toward the exterior, said interleaf having the form of an elongated strip, resting on the said border support portions, having a variable width, adapted to the axial distance between the said border support portions and always increasing when moving the length of the said interleaf from one extremity to the other, said width having a minimum value greater than or equal to the width of the extruded product.

6. Process according to claim 5, starting the winding of the said interleaf on the side of minimum width of the latter.

7. Process according to claim 5, in which the said interleaf is wound spirally by going from the part of the interleaf with the smallest width, immobilized on the bobbin at the point closest to the axis of rotation of the latter, toward the part of the interleaf with the largest width as movement is made away from the said axis of rotation.

8. Process according to claim 6 or 7, using a bobbin whose flanges are perforated, in which the bobbin on which the said product is wound is stored vertically.

9. A spool assembly for stockage of a rubber product thereon, comprising:

a base portion having an axis;

an elongate interleave member for supporting a rubber product thereon as both the interleave member and the supported rubber product are wound about the base portion, the interleave member having edge portions; and a pair of end portions secured to the base portion and axially spaced from one another, each end portion having a support surface for supporting an edge portion of the interleave member and the support surfaces forming at least one turn about the axis such that successive turns of the interleave member are supported on the axially spaced support surfaces of the end portions as the interleave member is wound about the base portion, the radial spacing of the support surfaces from the axis increasing in the winding direction along the at least one turn of the support surfaces and the axial spacing of the support surfaces from each other increasing in the winding direction along the at least one turn of the support surfaces, and the interleave member has a width measured perpendicular to its elongate direction which increases in correspondence with the increasing axial spacing of the support surfaces such that the interleave member is supported by the support surfaces out of contact with the already wound turns of the rubber product and its supporting interleave member that are supported on the more narrowly spaced extents of the support surfaces.

10. A spool assembly according to claim 9 wherein each support surface of the end portion has a spiral shape.

11. A spool assembly according to claim 9 wherein the axial spacing of the support surfaces from each other continually increases in the winding direction along the at least one turn of the support surfaces.

* * * * *